United States Patent [19]

Smith et al.

[11] 4,277,080
[45] Jul. 7, 1981

[54] QUICK HITCH POWER FRAME

[75] Inventors: Alexander Smith; Burton D. Baggs, both of Sanford, Fla.

[73] Assignee: Smitty's, Inc., Sanford, Fla.

[21] Appl. No.: 887,830

[22] Filed: Mar. 16, 1978

[51] Int. Cl.³ .............................................. B60D 1/14
[52] U.S. Cl. .................................... 280/473; 56/16.2;
180/53 D; 172/305
[58] Field of Search ............ 180/53 D; 280/473, 472;
56/14.7, 14.9, 16.2, 15.9, 15.6, 10.9, 10.7;
172/272–275, 800, 305, 297, 201

[56] References Cited

U.S. PATENT DOCUMENTS

| | | | |
|---|---|---|---|
| 2,788,728 | 4/1957 | Gray | 172/273 |
| 3,010,268 | 11/1961 | Freeman | 56/16.2 |
| 3,241,302 | 3/1966 | Barry | 56/16.2 |
| 3,612,187 | 10/1971 | Glass | 172/273 |

FOREIGN PATENT DOCUMENTS

226465  3/1963  Austria .................................... 280/473

Primary Examiner—Randolph A. Reese
Assistant Examiner—Donn McGiehan
Attorney, Agent, or Firm—Julian C. Renfro

[57] ABSTRACT

A quick disconnect arrangement for use on a tractor or other such farm or grove vehicle principally involving the use of an elongate structural member having an essentially straight mid portion, with this member being removably supported from the tractor at its front and rear ends. This elongate structural member is supported outboard of the adjacent driving wheel of the tractor, and its mid portion is utilized for the support of a rotary implement such as a cultivator or mower, or alternatively for other implements, such as a banker or a debanker. Advantageously, the front and rear support members are in effect quick disconnect means such that the operator can in a period of a few minutes entirely free the tractor from the elongate support member as well as the implement carried thereby, thus enabling the tractor to be used for an entirely different purpose. Thereafter, also in a matter of a comparatively few minutes, the elongate member can be reinstalled such that the implement is promptly ready for reuse.

8 Claims, 13 Drawing Figures

QUICK HITCH POWER FRAME

BACKGROUND OF THE INVENTION

For many years it has been known to utilize power driven devices such as mowers and cultivators, which make it possible for an operator to perform a substantial amount of work in a field as well as in and around and under trees with a minimum of effort and expense.

In areas where trees such as citrus trees are grown commercially, the limbs of the trees in many instances are heavily weighted by fruit, causing them to hang low, and frequently to present a substantial problem to a tractor operator concerned with mowing or cultivating, in that he must avoid injury to himself, to the trees, and to the fruit.

Before the advent of rotary implements that were laterally shiftable, it was not possible to effectively mow the growth or cultivate the soil beneath the low hanging branches of citrus and other trees in order to reduce the acidity as well as pests, generally promote the welfare of the tree, the yield of fruit, and enhance appearance.

In accordance with our U.S. Pat. No. 2,777,272 entitled UNDER TREE MOWER AND HARVESTER, which issued Jan. 15, 1957, we taught a mower and harvester which could be projected and retracted at the behest of the operator. Normally the rotary implement is maintained in the outward position found most effective, but as the tractor neared a tree, the rotary implement can be retracted laterally, so as to avoid tree contact. In that patent we taught an implement suspension arrangement involving multiple hinge points, thus enabling the implement to have a floating type characteristic such that is easily followed ground contours. In that patent we also taught the use of a number of discrete, chain driven rotary cutters disposed at spaced locations along the longitudinal axis of the cultivator, with it being possible for the operator to pivot the entire cultivator assembly upwardly on occasion.

Our U.S. Pat. No. 2,882,978 entitled "UNDER TREE CULTIVATOR" was concerned with a similar teaching, but involved a novel extensible frame arrangement, as well as featuring all hydraulic controls.

Our U.S. Pat. No. 2,976,663, which issued Mar. 28, 1961, entitled "UNDER TREE HOE MOWER" was also similar in making it possible to mow or cultivate in and around trees, but this devide utilized a mounting arrangement including a bracket attached adjacent a portion of the engine by means of bolts, and while this arrangement was highly effective, it involved a rather complicated procedure to install the cultivator or mower on the tractor, and a considerable amount of effort to later remove it from the tractor. As a result, a tractor equipped with an under tree cultivator mower typically was set aside and not used for other duties. This of course increased the financial demands on the grower, for it was therefore necessary for him to either undertake the time and effort involved in the removal of the cultivator equipment when the tractor was to be used for other purposes, or else involved him having to undertake the expense of purchasing an additional tractor to be available for non-under tree use.

All of the under tree devices previously patented were not limited to cultivators utilizing a plurality of rotary cutters disposed at spaced locations along the centerline of the cultivator, for in accordance with our U.S. Pat. No. 3,181,619 which issued May 4, 1965, that cultivator utilized an elongate shaft running the length of the cultivator, with such shaft having a number of ground-engaging teeth thereon, and with the centerline of the shaft disposed perpendicular to the longitudinal centerline of the tractor.

Other patentees have obtained patents on similar equipment in which power for the cultivator or mower was obtained from the power take-off unit of the tractor. Such prior art patents include the Alzani et al U.S. Pat. No. 3,183,978 and the Wathen U.S. Pat. No. 3,313,094. Each of these involved a shaft arrangement extending generally forwardly from the power take-off unit at the rear of the tractor, but unfortunately, such designs involved such forwardly extending shaft running inboard of the large drive wheel at the right rear of the tractor. The close-by location of the large wheel necessarily placed a restriction on lateral shaft movement, and therefore on lateral cultivator movement. This coupled with the usual difficulty of providing cultivator support structure that could be added to or removed from the tractor rapidly meant that such agriculteral devices and equipment enjoyed scant commercial success. It was a desire to improve upon these burdensome arrangements of the prior art that occasioned the novel and highly advantageous design in accordance with the present invention.

SUMMARY OF THIS INVENTION

In accordance with the present invention we have provided a novel and highly advantageous cultivator support arrangement for use with a tractor, such that it is no longer necessary to tie up the tractor for long periods of time, and thereby prevent its use for general purpose duties around a grove, orchard or farm.

We utilize an elongate structural member of essentially straight configuration that is secured outboard of either of the large driving wheels at the rear of the tractor, with this structural member being essentially parallel to the longitudinal centerline of the tractor. Instead of having any portion of this elongate structural member fasten directly to the frame of the tractor utilizing a series of bolts or the like, novel front and rear supports utilizing pin joints are utilized, such that this elongate structural member can either be added to, or removed from the tractor in a period of a few minutes.

We provide support at the rear of this structural member in the form of an elongate chain housing arranged at its input end to receive power from the power takeoff of the tractor, with rotary power from the chain housing being delivered at a location outboard of the adjacent driving wheel of the tractor. An elongate drive shaft is arranged to receive this power, and to deliver same forwardly to the cultivator or mower being employed at that time. This arrangement makes it conveniently possible for the cultivator or mower to undertake extensive movements toward and away from the tractor, thus making it ideally suited for under tree cultivation. The elongate shaft easily avoids contact with the rear wheel, as was of course prone to occur when in accordance with the prior art, the power transmitting shaft was located inboard of the rear wheel.

At a side location near the front of the tractor, generally in the vicinity of the engine, a relatively permanent structural member is secured, with this member being arranged to interface with a novel removable member directly concerned with the support of the forward end of the elongate structural member.

By the use of a pair of large turnbuckles or the like, a structural connection permitting an adjustable relationship of the permanent structural member to the removable support member is effected, and by the utilization of an actuator such as a hydraulic actuator, a suitable amount of power is made available such that the operating position of the cultivator or the mower with respect to the centerline of the tractor can be easily changed by the operator during operation of the device, thus making possible thorough cultivation or mowing between trees or other obstructions.

By placing the elongate structural member as well as the elongate forwardly extending shaft outboard of the adjacent driving wheel of the tractor, a considerable amount of freedom of motion is afforded, which was not possible in accordance with prior art arrangements. The elongate structural member is essentially straight and disposed a uniform distance above the ground, thus making it possible for the support assembly of the cultivator or the mower to be positioned thereon in the most effective position in a fore and aft sense, when taking into consideration the particular effort to be accomplished.

For example, the novel structural arrangement in accordance with this invention makes it possible to mount the rotary implement at a far forward location on the elongate structural member, which is highly advantageous in that if the implement is a cultivator utilizing a counter-rotating blade, there is comparatively little tendency for this to cause a lateral displacement of the comparatively small front wheels of the tractor. On the other hand, when the rotary implement is in an aft position, this enables the operator to "ring" a tree easily, that is, mow or cultivate completely around each tree. A substantial moment arm is created as a result of this positioning of the implement, which means that the counter rotation of a cultivator rotor can cause a substantial lateral force with respect to the front wheels, which is usually quite desirable when circling.

In accordance with our novel and highly advantageous design, therefore, the operator can install the rotary implement assembly at the most advantageous longitudinal position for his particular purposes, with at all times it being easily possible for all of such equipment to be removed from the tractor in a comparatively few minutes, so that the tractor may thereafter be used for an entirely different purpose.

It is therefore a principal object of our invention to provide a readily removable structural arrangement that may be added to a tractor or like device such that a cultivator, mower or other implement may be quickly installed upon or removed from the tractor, in each instance involving but a minimum of tools.

It is another object of this invention to provide a support arrangement for a rotary implement such that its position on a tractor can be adjusted in a fore and aft sense to the most advantageous location for a particular job to be accomplished.

It is yet another object of this invention to provide a support arrangement for a cultivator or mower that readily enables the rotary implement to be moved without interference for substantial distances between outboard and inboard operational locations, thus simplifying the task of cultivating and mowing around trees and the like.

It is still another object of this invention to provide a power train arrangement for a tractor, which extends outboard of the adjacent driving wheel of the tractor, thus minimizing any interference with lateral movements of the cultivator or mower.

It is yet still another object of our invention to provide a novel support arrangement for both rotary and nonrotary implements.

These and other objects, features and advantages will be more apparent as the description proceeds.

DETAILED DESCRIPTION

Figure 1:
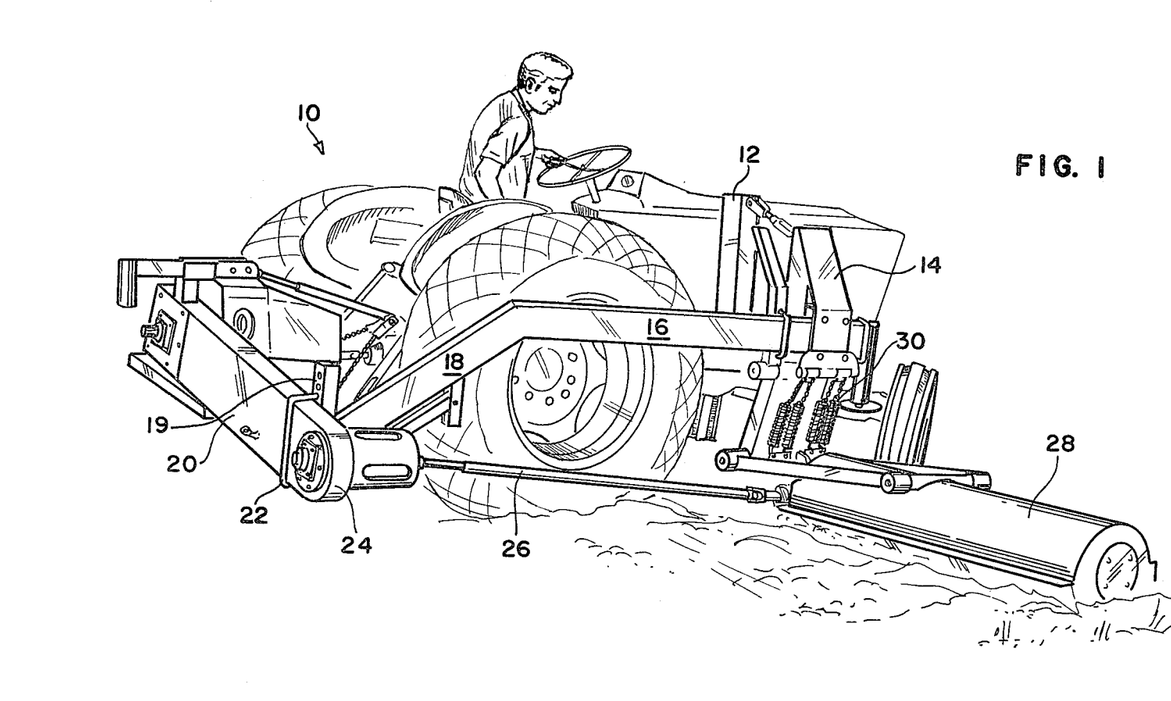
FIG. 1 is a perspective view of a tractor utilizing a cultivator supported by our novel quick disconnect arrangement.

Referring to FIG. 1, it will there be seen that we have shown a tractor 10 equipped with certain novel apparatus in accordance with this invention, such including a member 12 fixed on a forward portion of the tractor, to serve as the support for removable support member 14. Latter member in turn supports the forward end of an elongate structural member 16 that extends for a substantial distance essentially parallel to the centerline of the tractor, and outboard of the large driving wheel on the right rear of the tractor, although at the user's option, the member 16 could be reconfigured somewhat and then installed outboard of the left rear wheel. The principal portion of the novel structural member 16 is essentially straight and of a uniform height for a considerable distance, with the occasion for such construction being more apparent as the description proceeds.

The rear portion of the elongate structural member 16 may form a downwardly tapering portion 18, at the terminus of which is located a sturdy, vertically disposed member 19. This latter member is provided with a series of paired holes, into any one pair of which may be inserted the threaded ends of a large U-bolt 22 concerned with securing the rear end of structural member 16 to the outboard end of chain housing 20. As will hereinafter be described in greater detail, the chain housing serves to redeliver the power originating at the power take-off (PTO) of the tractor 10, to an outboard location 24, at which a substantial amount of torque is applied to a shaft 26 that extends forwardly in order to supply power to a rotary implement such as a cultivator 28 supported from the structural member 16. It is to be understood that in accordance with the practice of this invention, a mower or other such implement could be used instead of a cultivator at this location.

The details of the cultivator are not per se a part of the present invention, and for example the cultivator could be of the general type shown in any of our U.S. Pat. Nos. 2,976,663, 3,181,619, or 4,044,841. We find that a counter-rotating cultivator blade is particularly effective in effectively chopping up encountered clods, vegetation and debris, and mixing same with the soil, but this arrangement often results in a considerable lateral force being applied to the front wheels of the tractor. Therefore, the preferred position for a cultivator of the counter-rotating blade type is in the far forward location shown in FIG. 1. We prefer to utilize a plurality of tension springs 30 in order to lessen the weight of the cultivator on the ground. The suspension arrangement for the cultivator will be described at greater length hereinafter.

It is of particular importance to realize that the member 14 as well as the chain box 20 are constructed so as to be easily separable from mating components on the tractor, as will be set forth in detail shortly. As a result, the principal structural member 16 can be quickly removed from the tractor, along with any rotary implement supported therefrom, thus freeing the tractor for service of a different type.

Figures 2A, 2B, 2C:
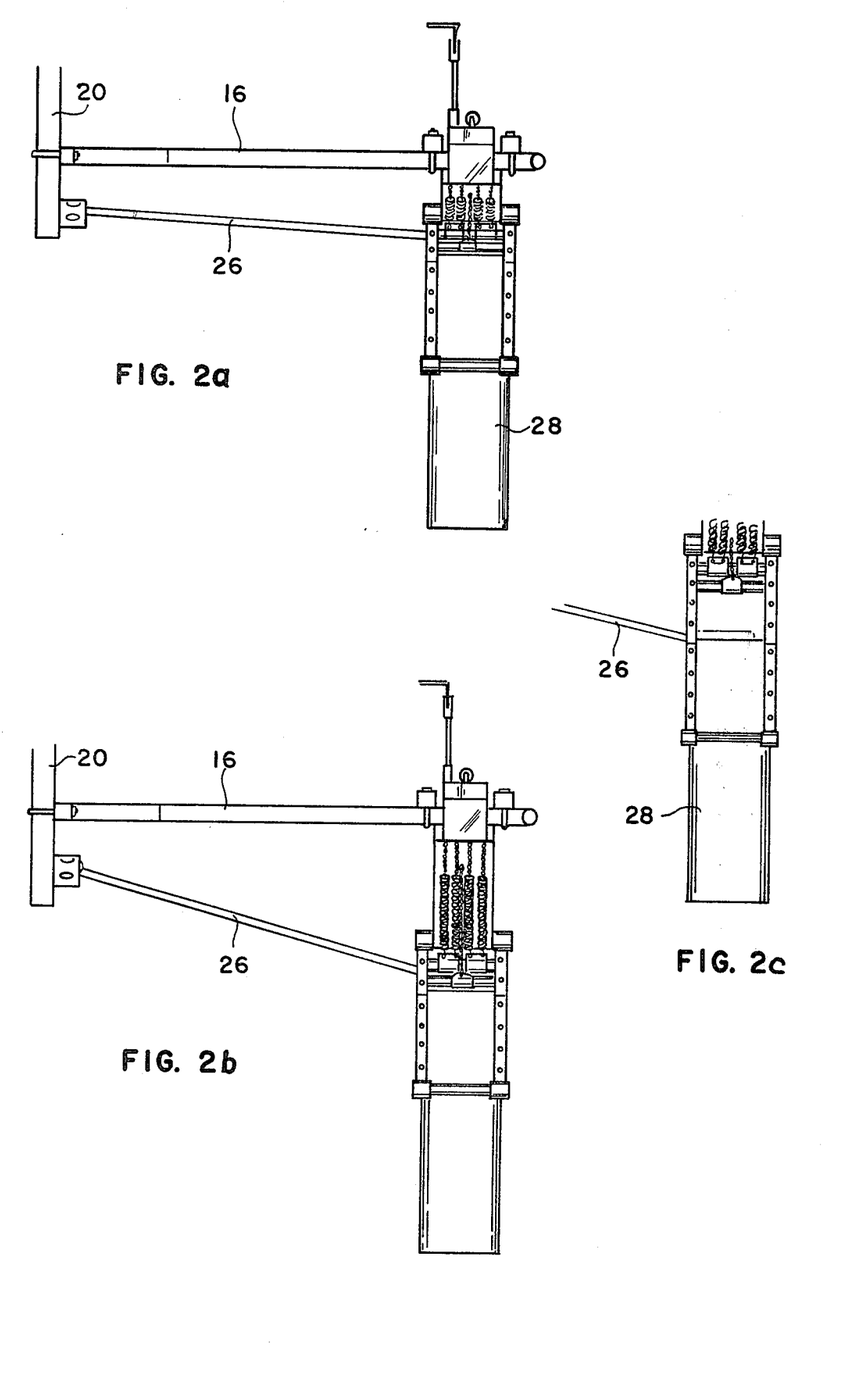
FIGS. 2a, 2b and 2c are related views illustrating inboard and outboard operative positions of a cultivator mounted in a forward position on the principal structural member.

Turning to FIGS. 2a, 2b and 2c it is to be realized from related FIGS. 2a and 2b that we there illustrate a cultivator supported from a forward position on structural member 16, with the cultivator shown in inboard as well as outboard operative positions. The outboard position of the cultivator is normally the most effective position, but when operating in the vicinity of trees, such as are usually planted in a uniform arrangement in a grove or orchard, it is most convenient for the operator to be able to avoid tree contact merely by momentarily retracting the cultivator. A typical retraction stroke may be approximately 20 inches, and the arrangement by which this is accomplished will be discussed at length hereinafter.

FIG. 2c reveals an arrangement by which cultivators of certain length can be mounted in an extended outboard position. A series of mounting holes are provided on say three inch centers on pairs of front and rear structural members of the cultivator, and as will afterward be explained in greater detail, the operator can select the distance the cultivator is spaced outboard of the tractor by the appropriate placement of bolts in aligned holes.

Figure 3A:
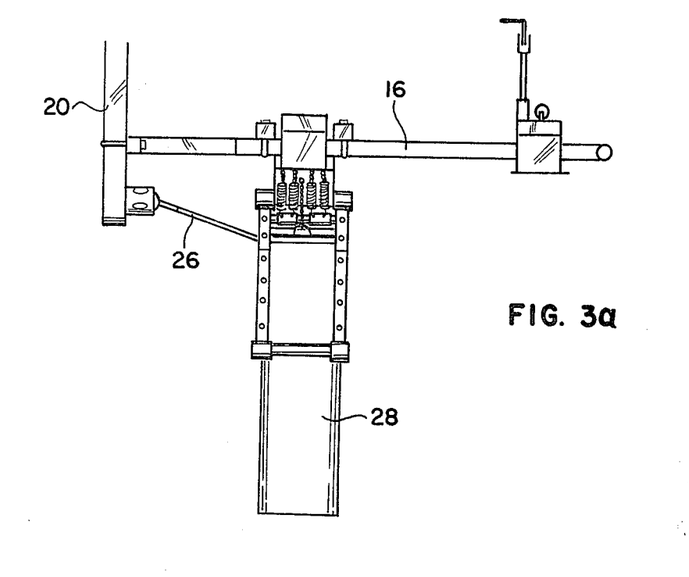
FIGS. 3a and 3b are related views showing the cultivator in outboard and inboard operative positions associated with an aft mounting location on the structural member.
Figure 3B:
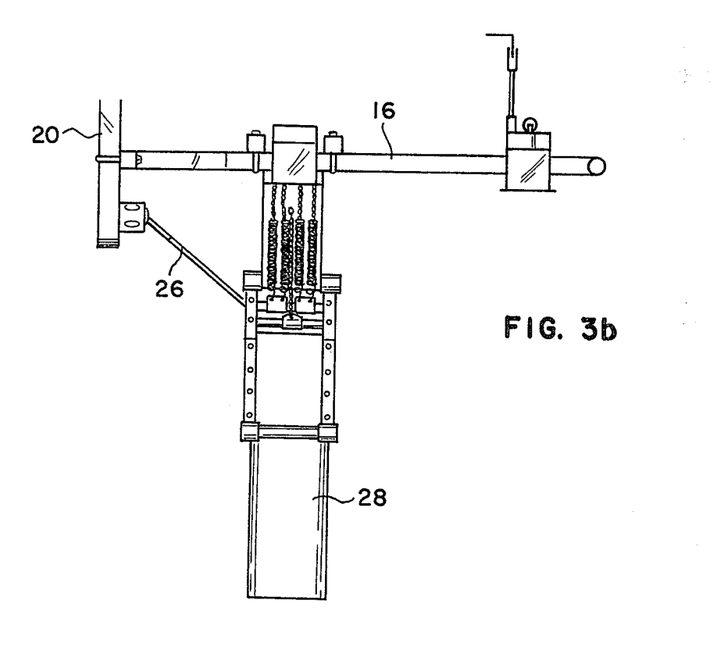

It is normally advantageous to mount certain rotary implements comparatively far forward on the principal structural member 16, which is of course the implement position shown in FIG. 1, and depicted in FIGS. 2a and 2b. Although as previously explained, a contra-rotating rotor installed in the far forward position creates much less lateral force at the front wheels than is the case if the cultivator is disposed in a far aft operating position on the member 16, on the other hand, while in the far forward position, it is difficult for the operator to "ring" a tree. Therefore, in accordance with this invention, it is relatively easy for the operator to shift the rotary implement to an aft operating position on the member 16 as depicted in FIGS. 3a and 3b, so that on occasion, the operator can drive completely around each tree of a grove or orchard, with the implement disposed in the rearward location most effective for this particular purpose. Irrespective of the fact that the operator installs the rotary implement in the far forward, far aft, or some intermediate position on the principal structural member 16, he can move the rotary implement easily between outboard and inboard operating position merely by suitable manipulation of certain hydraulic controls on the tractor, as hereinafter discussed in some detail.

Other consequential details associated with the fact that we can utilize the rotary implement in various operative locations on the member 16 will be subequently discussed at some length, as will be specific arrangements by which the principal structural member 16 may be readily removed from the tractor when circumstances warrant.

THE POWER TRAIN

Figure 4:
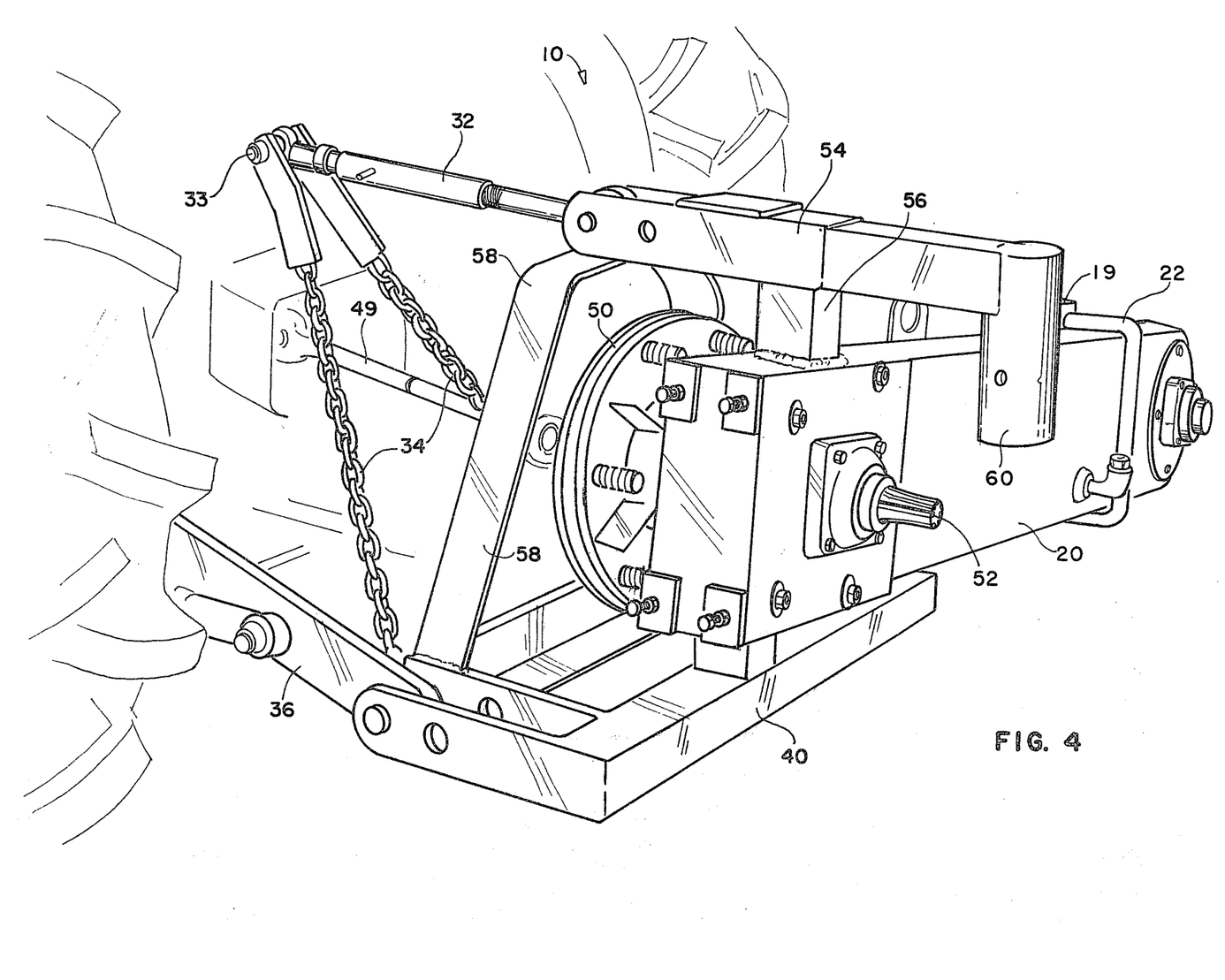
FIG. 4 is a perspective view to a larger scale in order to illustrate the constructional details associated with the chain housing and its support.

Turning now to FIG. 4, it will be seen that we have there revealed the arrangement by which the inboard end of the chain housing 20 is operatively supported at the rear of the tractor 10, adjacent the power take-off (PTO) of the tractor. This part of our invention is specifically configured to be supported from the three point suspension conventional to a wide assortment of tractors. To the upper attachment point 33 of the tractor we attach one end of a top link 32, whose length is readily adjustable. The other end of top link 32 attaches to a structural member 54 extending substantially transversely to the length of the chain housing 20, and secured to the top thereof. Also supported from upper attachment point 33 are a pair of support chains 34 that attach preferably by clamping to the lower forward portion of a structural frame 40 disposed under the chain housing 20. Although during tractor operation these chains 34 bear the principal portion of the weight of the chain housing 20, we make various uses of the rearwardly extending arms 36 conventional in agricultural tractors, such as for maintaining a desirable spacing between the structure 40 and the rear part of the tractor.

Figure 5:
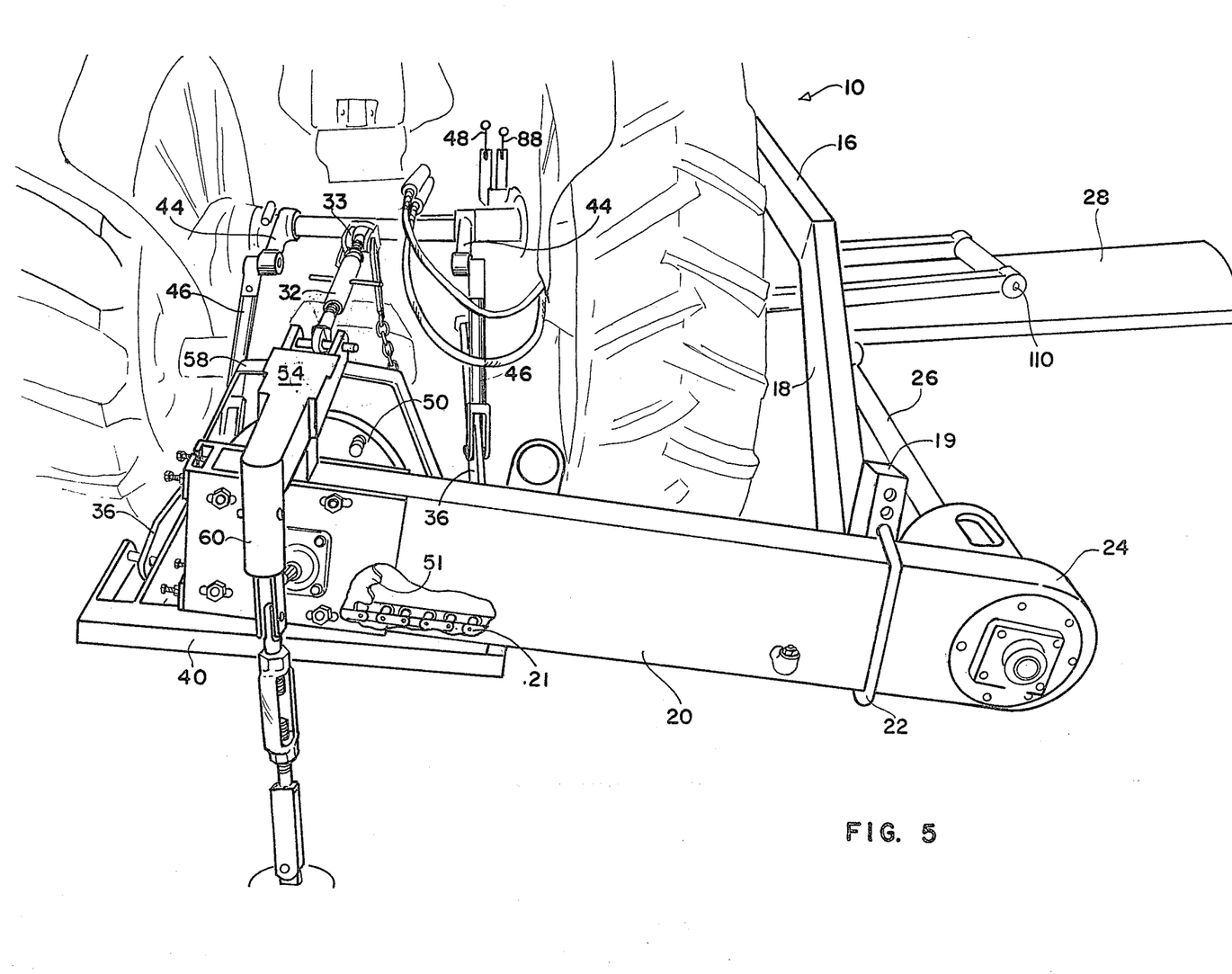
FIG. 5 is a rear perspective view illustrating the relationship of the chain housing to the rear of the tractor as well as to the rear of the principal structural member.

As will be noted from reference to FIG. 5, a pair of hydraulically powered lifting arms 44 are provided in accordance with conventional tractor design, with these arms connected by means of links 46 to the lower arms 36. By suitable manipulation of control lever 48 as shown in FIG. 5, the operator of the tractor can readily adjust the height of the arms 36 so as to bring holes in the rear part of these arms into substantial alignment with holes in the forward end of structure 40 during the during the chain housing installation procedure. Upon alignment being achieved, steel pins can be inserted through the holes, thus to secure the arms 36 firmly to the housing 40. We prefer the use of pins utilizing a type of cotter key at each end, thus to prevent the undesirable loss of the pins during the operation of the machine.

It is important to note that the hydraulically operable lifting arms 44 function very effectively during both the installation and the removal procedure associated with the chain housing, and in addition, the appropriate use of these arms makes it possible for the operator to be able to desirably align the power output shaft of the tractor with the power input shaft associated with the chain housing. Such proper alignment will enable the drive shaft 49 extending between these shafts to reside in an essentially horizontal position. Upon this being achieved, the length of the chains 34 is carefully adjusted such that they will bear the weight of the chain housing in a position such that the drive shaft 49 remains in the desired substantially horizontal position. This setting may be achieved in any of several ways, but preferably by placing an appropriately placed link of each chain in a receiving bracket on the housing 40 as will carry out this purpose. A universal joint is preferably utilized at each end of drive shaft 49.

FIG. 4 further reveals that the power supplied by drive shaft 49 is applied to clutch 50, which in turn delivers power to the input sprocket 51 of the chain housing; note FIG. 5. Another sprocket (not shown) is disposed at the outboard end of the chain housing, and these two sprockets serve as a means around which endless drive chain 21 extends. This chain is of sturdy construction, and it enables substantial amounts of power to be applied from the engine of the tractor, through the drive shaft and clutch, and thereafter through the components of the chain housing and eventually power is applied to the shaft 26. The shaft 26 in turn connects to the gearbox of the rotary implement.

Although we are not to be so limited, we prefer to construct the chain housing of $\frac{1}{4}'' \times 4'' \times 12''$ rectangular tubing. The $\frac{1}{4}''$ sidewall thickness we prefer enables a properly supported chain housing to form an adequate support for the rear end of the principal structural member 16. To assure quiet and trouble-free operation, we prefer to close the ends of the housing in a leak proof manner, and to maintain lubricating oil to a proper depth in the housing at all times.

Returning momentarily to the structural member 54, best shown in FIG. 4, the mid portion of this component is supported by a short vertical member 56 affixed to the top of the housing 20, whereas the forward portion of the member 54 is supported by an arch-shaped member 58 whose lower ends are supported from the frame 40. At the location of the rearmost portion of the structural member 54 is a downwardly turned jack point 60 that is not utilized while the rotary implement is in active use.

Referring to FIG. 5, it is to be seen that the point 60 may be effectively used in conjunction with a jack-like member such as a turnbuckle so that weight on occasion may be taken off the chain housing. Ordinarily, the lifting arms 44 of the tractor suffice to lift the chain housing sufficiently as to make it unnecessary to create a lifting effort by the device installed in jack point 60.

The Forward Support For The Principal Structural Member

Figures 6A, 6B:
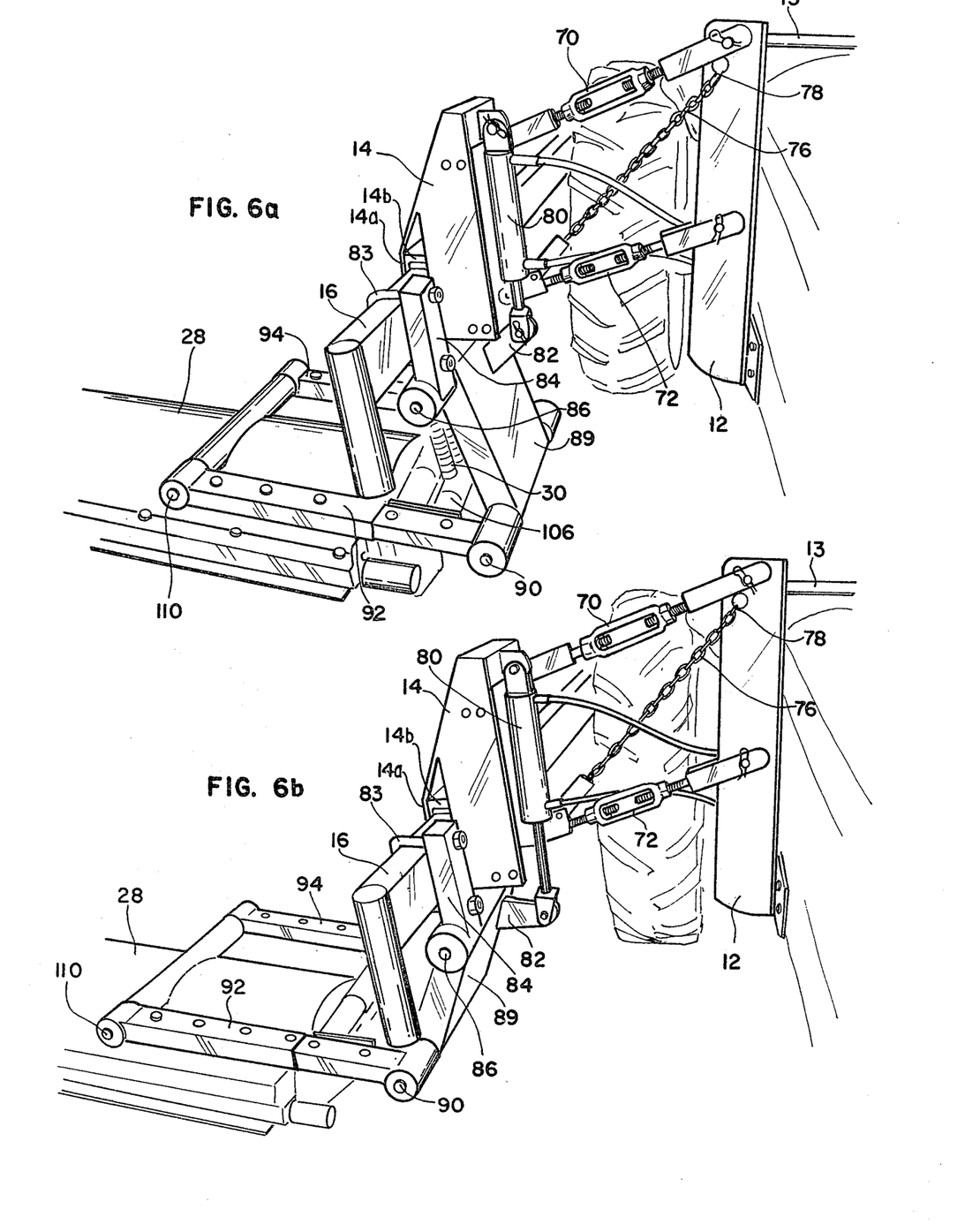
FIGS. 6a and 6b are related figures showing forward support details for the principal structural member as well as the means by which a cultivator supported by the principal member is moved between inboard and outboard operative positions.

Turning to related FIGS. 6a and 6b, it will there be seen that we illustrate the fixed support member 12 in a typical position at the forward end of the tractor which, for example, may be in a positive essentially corresponding to a mid portion of the engine of the tractor.

Most tractor manufacturers provide mounting pads at such locations, and it is to such pad or pads that we secure the vertical member 12. In the event only limited number of mounting pads are provided, we may utilize a bar 13 connected across the top of the tractor to a similar vertical member secured to the opposite side of the forward end of the tractor, in this way forming a yoke of sufficient strength to support the weight of the forward end of the principal structural member 16 as well as the rotary implement.

As previously indicated, the member 12 is semi-permanently affixed to the tractor, with removal of the apparatus associated with the mounting of the rotary implement being effected by the use of readily operated disconnect means. Although we are not to be so limited, we may, as shown in FIGS. 6a and 6b, utilize a pair of large turnbuckles 70 and 72, which extend between appropriately spaced points on the member 12, and similarly spaced points on the removable forward member 14. As is characteristic of our entire design, we prefer to secure each end of each turnbuckle to the adjacent members by the use of steel pins, in each end of which is a suitable cotter key to prevent dislodgement.

The removable forward member 14 directly concerned with the support of structural member 16 must necessarily be of sturdy construction, and for example may be made of steel components $\frac{3}{8}''$ thick that have been welded together to create a type of vertically elongated box. Inasmuch as the box 14 is designed to form the principal support for the actuator 80 we utilize for movement of the cultivator in a lateral manner, we construct the portion of the box nearest the engine of the tractor to be open, thus enabling necessary movement of the actuator during its elongation to avoid undesired contact with any structural portion of the box. While we are not to be limited to the use of a hydraulic actuator, such is preferred.

While the support arrangement involving the turnbuckles 70 and 72 may adequately serve to enable the removable forward member 14 to be brought into a desired, essentially parallel relation to the fixed member 12, they do not prevent the member 14 from tending to move downwardly from the desired position. Therefore, we may utilize a chain 76 extending somewhat diagonally between the inboard end of turnbuckle 70 and the outboard end of turnbuckle 72. The lower chain end is ordinarily fixed, whereas the upper chain end is received in an appropriate slot 78, with it being a relatively simple matter for the operator to select the desired height for the member 14 by the appropriate selection of the proper chain link to fit into the slot 78. It should be obvious that by virtue of the inherent wide range of adjustments made possible by the use of turnbuckles and chains, that the operator can readily establish the proper height of the member 14, and therefore of the forward end of the structural member 16.

Figure 7:
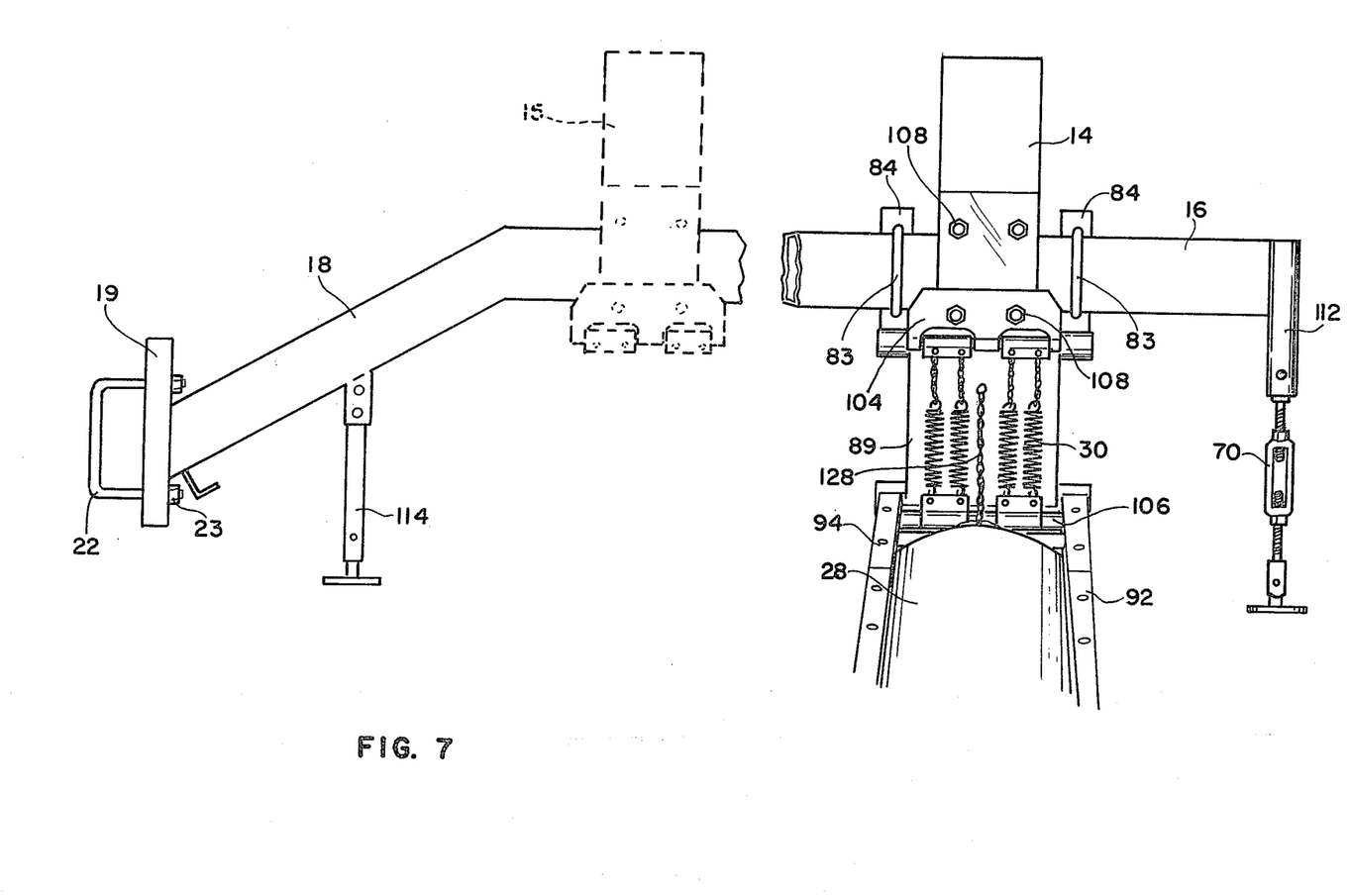
FIG. 7 is a fragmentary view of the principal structural member, revealing certain aspects of the cultivator support arrangement, as well as the spring arrangement used as a form of counterbalance for the cultivator.

Referring to FIG. 7, it will there be seen that the principal structural member 16 is directly concerned with supporting the rotary implement, such as cultivator 28, in the selected position. As revealed in this figure as well as FIGS. 6a and 6b, we may use a pair of short, sturdy structural members 84 in order to form appropriate front and rear connections between the cultivator and the member 16, with the members 84 being clamped in the selected position on the member 16 by means of U-bolts 83.

Left and right members 84 are utilized with the lower portion of each of these members being provided with a sleeve-like member, in which are received respective journal ends located at the upper corners of a pivoted member 89. In this way, hinge type joints 86 are created, such that the member 89 may move between positions revealed in FIGS. 6a and 6b, and in doing so causing lateral movements of the cultivator. An arm 82 is affixed to the inboard side of member 89, to the end of which arm is pivotally secured the lower portion of the actuator 80. Thus, as the operator by appropriate movement of the control handle 88 (FIG. 5) causes the actuator 80 to extend, the member 89 pivots away from the tractor, in the outboard direction shown in FIG. 6b, whereas when he moves the control handle in the opposite direction, the member 89 is caused to move inboard, as shown in FIG. 6a.

The lower corners of the member 89 are pivotally connected by joints 90 to front and rear arms 92 and 94 of the cultivator.

The front arms 92 and the rear arms 94 of the cultivator are each made up of a pair of telescoping members, each containing on its upper surface, a series of aligned holes, such as holes disposed on say three inch centers. As indicated in connection with FIGS. 3a and 3b, the distance away from the tractor that the outboard end of the cultivator is disposed can be established in accordance with the needs of the particular situation, and such entails the placement of bolts in the aligned holes selected to best provide the desired relationship of the cultivator (or mower) to the tractor.

It has been earlier mentioned that a group of say four tension springs 30 may be used for lessening the weight of the cultivator on the ground, and as shown in FIG. 7, the upper ends of these springs may attach to a spring support plate 104 bolted to the bottom of the removable support member 14. The lower ends of each pair of springs are fixed to sleeves mounted on a bar 106 extending between the arms 92 and 94 parallel to, but say six inches away from, the main support joint 90. Note FIGS. 6a and 7 in particular.

As is obvious, the strength of the springs chosen can be selected to reflect the weight of the particular cultivator being used in a given instance, and various adjustments may be made as to the support chosen for the springs 30, so that an optimum amount of lifting force is achieved. The cultivator support arrangement utilized is not per se a part of this invention, but we prefer for the cultivator to be supported by the outer ends of the arms 92 and 94 at a pivotal connection 110 located at approximately the midpoint of the longitudinal dimension of the cultivator; note FIGS. 6a and 6b.

Figure 8:
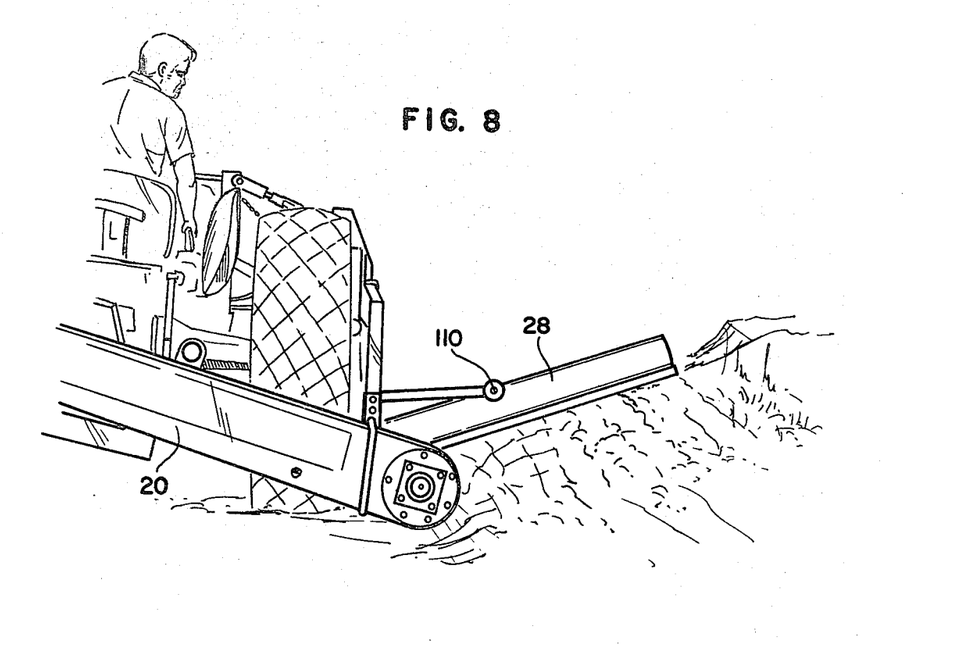
FIG. 8 is a rear view of the tractor in use, showing how the support for the cultivator permits it to operate on a plane inclined to the plane of the tractor.
Figure 9:
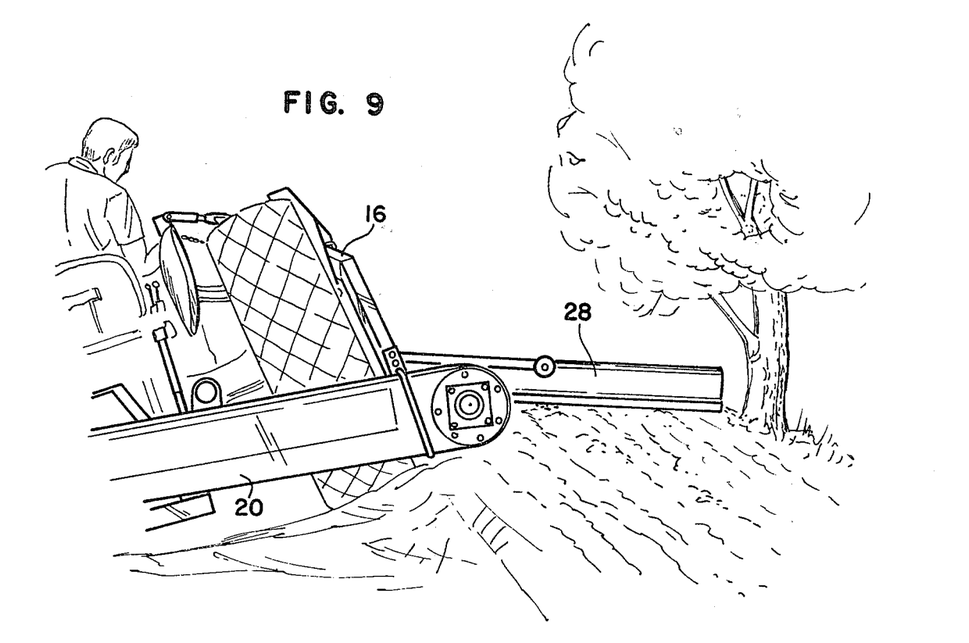
FIG. 9 is a view similar to FIG. 8, revealing how our cultivator mounting arrangement also permits operation in a plane inclined below the plane of the tractor.

There will be times that the operator will find it desirable to cultivate over uneven terrain, and in such instances it may well be that the cultivator will be disposed in a plane quite different from that of the tractor; note FIGS. 8 and 9 in this regard. In instances of this type, the double hinged support arrangement involving the member 89, and the midpoint suspension of the cultivator make it highly adaptable to the maintaining of the cultivator rotor in the desired ground contacting relationship.

Most importantly, in accordance with this invention, power may be continuously supplied to the gear box of the rotary implement throughout all of the movements of the implement, for the location of our elongate shaft 26 outboard of the adjacent wheel of the tractor advantageously enables a wide range of lateral as well as tilting movements of the cultivator to take place. We preferably provide the shaft 26 with one or more extensible joints, each involving a spline arrangement, so as to permit necessary elongation and contraction of the shaft throughout the range of movements of the cultivator.

The versatility made possible by the outboard placement of the shaft 26 is to be contrasted with the arrangement in accordance with the prior art, in which the forwardly extending shaft is disposed inboard of the driving wheel of the tractor. In this latter instance, the risk of contact between the shaft and the wheel is so realistic as to greatly restrict the extent of cultivator movements. Other power supplying arrangements designed to circumvent this latter problem have included the use of a drive shaft extending under the forward frame of the tractor in the vicinity of the engine crankcase. However, should the relationship of the cultivator to the tractor change considerably, such as in the manner shown in FIGS. 8 and 9, this poses a distinct risk of breakage of the universal joints associated with the drive shaft, due to too much angularity.

Details of Principal Structural Member

Turning now to a consideration of the principal structural member 16, it has of course been explained that the forward support member 14 serves to maintain the forward portion of the member 16 in the proper height relationship to the ground. As best seen in FIGS. 6a and 6b, the outboard portion of the member 14 may slope downwardly and away from the tractor, and thereafter turn downwardly in order to define an outer plate 14a that serves to define a slot 14b in which the forward portion of the member 16 is received. The principal portion of the member 16 is preferably made of 3 inch by 6 inch rectangular tubing having a ¼ inch wall thickness, and the slot 14b is sized to properly accomodate same.

A series of say four bolts 108, two located above the member 16 and two located below the member 16 extended substantially horizontally between the outer plate 14a and the interior of the main portion of the member 14; note FIG. 7. Upon sliding the member 16 to the desired relationship to the forward support member 14, the four bolts 108 are tightened securely such that undesirable sliding of the member 16 is entirely prevented. The previously mentioned support plate 104 for the springs 30 may be supported from the lower pair of bolts 108.

As previously explained, the chain housing 20 is designed to have sufficient strength and rigidity as to form an appropriate support for the rear end of the principal structural member 16. Inasmuch as there will be many instances in which the angularity of the relationship existing between the chain housing and the principal structural member 16 will need to be modified, we find it highly advantageous to utilize a connection means permitting a wide range of adjustment. As perhaps best shown in FIGS. 5 and 7, we have found a large U-bolt 22 to represent the best arrangement, with it to be understood that at the time the connection is being made between the members 16 and 20, the threaded ends of this U-bolt will be inserted into the pair of holes in member 19 that will provide the optimum height of the member 16 when the ground contour, the relative operating heights of the tractor and the rotary implement, and other such factors are taken into consideration. As is obvious, upon the proper relationship between the member 16 and 20 being attained, the nuts 23 on the threaded ends of the U-bolt 22 are tightened so as to secure the chain housing and the structural member in this optimum manner.

As previously described at some length, there are instances in which it is desirable to mount the rotary implement at an aft location on the member 16, such as in the position of the member 15 shown in dashed lines in FIG. 7. It is to be noted that the member 14 continues to exist in the previously described relationship to the fixed member 12, being maintained thus by the turnbuckles and the chain 76. The member 15, which may be substantially identical to the member 14, is arranged to be secured by the counterpart of the bolts 108 described in connection with member 14, such that the member 15 will not undesirably shift laterally on the member 16. Transferred in addition to the left and right structural members 84 and their U-bolts 83 are of course the member 89 and actuator 80. The members 83 and 84 are installed on the members 16 at locations spanning the member 15, and the member 80 is installed on the upper end of member 15 by the use of a steel pin. The upper ends of the springs 30 are of course to be installed on the upper spring support plate 104 of the member 15.

As is obvious, a different shaft 26 must be used when the mounting location of a rotary implement has been moved along the member 16 for a distance of several feet, for although such a shaft can be made sufficiently extensible as to permit the aforementioned lateral movements of a rotary implement, the shaft usually cannot accommodate a length change of the type indicated in FIG. 7.

As should now be apparent, we have described a highly advantageous quick disconnect arrangement for use with a tractor or other farm or grove vehicle such that in a period of fifteen minutes or so, the operator can remove the elongate structural member from the tractor so that the tractor can then be used for other purposes. Thereafter, the elongate structural member can be quickly reinstalled such that the tractor is returned to its original capability for cultivating, mowing, banking, de-banking and the like.

Although there are various ways that the elongate structural member and the implement carried thereby could be separated from the tractor, we prefer at a time that the tractor is to be used for other purposes, for the elongate structural member 16 and the chain housing 20 to be removed as a unit, or in other words, we typically do not loosen the U-bolt 22 at the time of removal of the structural member 16.

Inasmuch as in this instance, a three point support arrangement is quite stable, we prefer at the time of planned implement removal, to operate the arms 44 in the upward direction so as to provide sufficient space under the jack point 60 for the insertion of a component such as a turnbuckle, that will serve as a weight bearing device. The second support is formed by the tilting jack stand 114, and the third support point is formed at the front end of the structural member 16. Inasmuch as at the front of the device we do not have the benefit of the hydraulically operated lifting arms 44, we typically first remove the turnbuckle 70 from the position shown in FIGS. 6a and 6b, and insert it at the forward jack point 112. By a suitable handle or the like, we then manipulate the turnbuckle so as to raise the member 16 to such an extent that the tension on chain 76 is relieved. The slackening of the chain 76 means that the uppermost active link of the chain can be removed from the slot 78, after which the turnbuckle 72 can be removed, which of course allows the front end of the structural member 16 to be left free standing.

Upon removal of the pins from the various locations at the rear of the device, the tractor can then be driven away, leaving the elongate structural member 16 and the chain housing 20 standing as a unit on its three support points. When reinstallation is desired, the tractor is driven back to a position adjacent the members 16 and 20, and reassembly is undertaken.

We claim:

1. A quick disconnect arrangement for use in combination with a tractor or other farm implement, comprising an elongate structural member having a substantially straight mid portion, and front and rear support means for rigidly yet removably supporting the entire weight of said elongate structural member outboard of one of the driving wheels of the tractor, with said substantially straight portion residing essentially parallel to the longitudinal centerline of the tractor and adapted to support an implement thereon, portions of said front and rear support means being affixed to the tractor, and having quick disconnect means operatively associated with said elongate structural member, each end of said elongate structural member being readily releasable from support by the tractor by operation of said quick disconnect means.

2. The quick disconnect arrangement as defined in claim 1 in which means are provided such that the operating position of the implement on the mid portion of said elongate structural member can be selected in accordance with the specific use to which the implement is to be put.

3. The quick disconnect arrangement as defined in claim 1 in which said rear support means is an elongate chain housing adapted for delivering rotary power from the power take-off of the tractor, to the outboard end of said chain housing and an elongate, forwardly extending shaft for delivering power for use by an implement carried by said elongate structural member.

4. An elongate implement-supporting frame adapted for rapid installation upon a tractor or other farm implement, as well as rapid removal therefrom, comprising front and rear support means adapted to be operatively secured to the tractor, and an elongate structural member whose entire weight is rigidly yet removably supported by said front and rear support means in a manner generally aligned with the longitudinal centerline of the tractor, and located outboard of one of the driving wheels of the tractor, a mid portion of said elongate structural member being adapted to serve as a mounting means for a power operated implement, said front and rear support means having quick disconnect portions such that said elongate structural member may be rapidly released from association with the tractor, and at the user's option, thereafter be rapidly re-installed.

5. The elongate implement-supporting frame as defined in claim 4 in which means are provided for operatively installing a power operated implement at any of several selected locations on said elongate structural member.

6. The elongate implement-supporting frame as defined in claim 4 in which said rear support means is an elongate chain housing for applying rotary power, for use by a rotary implement supported from said elongate structural member.

7. A quick disconnect arrangement for use in combination with a tractor or other such vehicle comprising an elongate chain housing to be mounted at the rear of the tractor, and arranged to be operationally connected to the power take-off unit to the tractor, said chain housing serving as a structural member as well as containing an endless, power transmitting chain extending around sprockets operatively mounted in said housing such that power delivered to the sprocket adjacent the power takeoff of the tractor may be re-delivered to a location outboard of one of the rear drive wheels of the tractor, an elongate structural member extending for a substantial portion of the length of the tractor, and supported rigidly yet removably essentially parallel to the longitudinal centerline of the tractor, with means adjacent an outboard end of said chain housing serving to support the full weight of the rear end of said elongate structural member at a location outboard of the adjacent drive wheel of the tractor, means located in the general vicinity of the engine of the tractor, forming a forward support for said elongate structural member, said forward support comprising a member semi-permanently attached to the tractor, and a support means removably supported by said semi-permanently attached member, said support means being removably secured to the forward end of said elongate structural member, a mid portion of said structural member serving as a support for a power operated rotary implement, said means associated with the support of the forward and rear ends of said structural member being operable so as to permit ready release and removal of said elongate structural member from the tractor.

8. A quick disconnect arrangement for use in combination with a tractor or other such vehicle comprising an elongate chain housing to be mounted at the rear of the tractor, and arranged to be operationally connected to the power take-off unit of the tractor, said chain housing serving as a structural member as well as containing chain sprockets operationally mounted at each end, with an endless, power transmitting chain extending around said sprockets in such a manner that power delivered to the sprocket adjacent the power take-off of the tractor may be re-delivered to the sprocket remote from the power take-off, latter sprocket being located outboard of one of the rear drive wheels of the tractor, an elongate structural member extending for a substantial portion of the length of the tractor, and supported rigidly yet removably essentially parallel to the longitudinal centerline of the tractor, with the full weight of the rear end of such structural member being supported outboard of the adjacent drive wheel of the tractor by the outboard end of said chain housing, means located in the general vicinity of the engine of the tractor, forming a forward support for said structural member, said forward support comprising a member semi-permanently attached to the tractor, and a support device removably supported by said semi-permanently attached member, said support device being secured to the forward end of the structural member, a mid-portion of said structural member serving as a support for a selected power operated implement, said means associated with the support of the forward and rear ends of said structural member being operable so as to permit ready release and removal of the elongate structural member and the power operated implement from the tractor.

* * * * *